United States Patent [19]
Wagner

[11] Patent Number: 5,221,983
[45] Date of Patent: Jun. 22, 1993

[54] PASSIVE PHOTONIC LOOP ARCHITECTURE EMPLOYING WAVELENGTH MULTIPLEXING

[75] Inventor: Stuart S. Wagner, High Bridge, N.J.

[73] Assignee: Bell Communications Research, Inc., Livingston, N.J.

[21] Appl. No.: 299,401

[22] Filed: Jan. 19, 1989

[51] Int. Cl.$^5$ .................. H04B 10/20; H04J 14/02
[52] U.S. Cl. .................. 359/125; 359/124; 359/120; 359/118
[58] Field of Search .............. 370/3, 1, 2; 455/605, 455/607, 612; 350/96.16

[56] References Cited

U.S. PATENT DOCUMENTS

| | | | |
|---|---|---|---|
| 4,642,804 | 2/1987 | Personick | 370/3 |
| 4,658,394 | 4/1987 | Cheng et al. | 370/3 |
| 4,705,350 | 11/1987 | Cheng | 350/96.16 |
| 4,712,859 | 12/1987 | Albanese et al. | 350/96.16 |
| 4,736,360 | 4/1988 | McMahon | 370/3 |

OTHER PUBLICATIONS

"Design Considerations in Fibre-Optic Distribution Systems," Col. Wong and S. C. Patel., NTG Fachber, vol. 73, pp. 125–131, 1980.
"Single Mode Fiber Technology in the Subscriber Loop Environment," P. Kaiser, Proc. OFC 1987, Reno, Jan. 1987, paper MD1.
"A Wide-Band Local Access System Using Emerging Technology Components," L. R. Linnell, IEEE J. Selected Areas Comm., vol. SAC-4, pp. 612–618, Jul. 1986.
"Local Line Single Mode Optics–Viable Options for Today and Tomorrow," P. Cochrane et al., IEEE J. Selected Areas Comm., vol. SAC-4, pp. 1438–1445, Dec. 1986.
"Residential Fiber Optic Subscriber Loops–Information Pipeline or Technology Pipedream?," B. S. Mullinix, IEEE J. Selected Areas Comm., vol. SAC-4, pp. 1446–1450, Dec. 1986.
"A Conceptional Design on Optical Frequency-Division Multiplexing Distribution Systems with Optical Tunable Filters," H. Toba et al., IEEE J. Selected Areas Comm., vol. SAC-4, pp. 1458–1467, Dec. 1986.
"Transparent Single-Mode Fiber Optical Networks," D. B. Payne and J. R. Stern, J. Lightwave Tech., vol. LT-4, pp. 864–869, Jul. 1986.
"Echelon Grating Multiplexers for Hierarchically Multiplexed Fiber Optic Communication Networks," D. H. McMahon, Appl. Opt. vol. 26, No. 11, pp. 2188–2196, Jun. 1, 1987.

Primary Examiner—Edward L. Coles, Sr.
Assistant Examiner—R. Bacares
Attorney, Agent, or Firm—Leonard Charles Suchyta; Loria B. Yeadon

[57] ABSTRACT

A fiber optic subscriber loop architecture is disclosed. The architecture utilizes a double star configuration comprising a Central Office and a plurality of Remote Nodes. Illustratively, in the Central Office, one bank of N lasers supplies wavelengths $\lambda_1, \lambda_2 \ldots \lambda_N$ in a first wavelength band to form channels on which downstream information will be transmitted to subscribers. In one embodiment, a second bank of N lasers operating at wavelengths $\lambda^{N+1}, \lambda_{N+2} \ldots \lambda_{2N}$ in a second wavelength band is used to form unmodulated channels to be delivered to subscribers for use in subsequent upstream transmissions. Groups of N wavelength channels are combined via WDM techniques at the Central Office before being transmitted over feeder fibers to the Remote Nodes. In the downstream direction, the Remote Nodes rearrange the wavelength channels received from the Central Office so as to route two wavelength channels, one modulated channel from the first wavelength band and one unmodulated channel from the second wavelength band, to each of a plurality of subscriber premises attached thereto. At each subscriber station, the modulated channel is decoded while the unmodulated channel is modulated with upstream information and transmitted back to the associated Remote Node. Each Remote Node multiplexes groups of the modulated channels from the second wavelength band and routes them back to the Central Office over the feeder fibers. In the above-described double-star subscriber loop architecture, there are no active devices in the Remote Nodes.

8 Claims, 7 Drawing Sheets

PASSIVE PHOTONIC LOOP ARCHITECTURE EMPLOYING WAVELENGTH MULTIPLEXING

FIELD OF THE INVENTION

The present invention relates to a fiber optic subscriber loop architecture for delivering wide bandwidth telecommunications services to subscriber premises using optical fibers.

BACKGROUND OF THE INVENTION

With the advent of optical fiber telecommunications technology, the delivery of broadband services such as high definition video to subscriber premises is now possible. Accordingly, there has been much consideration of fiber optic subscriber loop architectures. The subscriber loop refers to the portion of a telecommunications network which goes directly into the subscriber premises. (See, e.g., P. Kaiser, "Single mode fiber technology in the subscriber loop environment," in Proc. OFC 1987, Reno, January 1987, paper MD1; Linnell, L. R., "A wide-band local access system using emerging technology components," IEEE J. Selected Areas Comm., SAC-4, July 1986, pp. 612-618; P. Cochrane et al., "Local line single mode optics—viable options for today and tomorrow," IEEE J. Selected Areas Comm., SAC-4, December, 1986, pp. 1438-1445; B. S. Mullinix, "Residential fiber optic subscriber loops—information pipeline or technology pipedream" ibid., pp. 1446-1450).

Virtually all fiber optic subscriber loop designs utilize some form of multiplexing over at least a portion of the signal path, with information to and from different subscribers being multiplexed together on the same fiber. Thus, the choice of multiplexing technique is a fundamental part of the subscriber loop architecture, and it will have an important impact on cost, complexity, power requirements and flexibility.

A wide variety of multi/demultiplexing techniques are available for combining and separating different subscriber channels on an optical fiber. Among the possibilities are high speed time division multiplexing (TDM), various forms of wavelength division multiplexing (WDM), code division multiplexing, polarization multiplexing, and subcarrier frequency multiplexing. At present, the most common multiplexing technique is TDM. TDM techniques have been used extensively in wideband subscriber loop prototypes (see, e.g., Linnell, L. R., "A wide-band local access system using emerging technology components," IEEE J. Selected Areas Comm., SAC-4, July 1986, pp. 612-618). Although transmitted using optical fibers, the processing and routing of such TDM signals is generally accomplished utilizing electronics. The TDM approach benefits from the relative maturity of electronics technology, though a fundamental drawback is the need for controlled environmental vaults, power back-up and maintenance at the processing site.

Consider, for example, a double-star subscriber loop architecture wherein there is a single Central Office, a plurality of Remote Nodes connected via optical fibers to the Central Office, and a plurality of subscribers connected via optical fibers to each Remote Node. The use of electronic TDM at the Remote Nodes involves optical-to-electrical and electrical-to-optical conversion of all signals coming into or out of the Remote Nodes, as well as the need for controlled environmental vaults, power back-up and maintenance at the Remote Nodes.

Of the many alternatives to TDM that use optical rather than electronic multiplexing, one of the most viable options is WDM (See, e.g., H. Toba et al., "A conceptual design on frequency-division-multiplexing distribution systems with optical tunable filters," IEEE J. Selected Areas Comm. SAC-4 December 1986, pp. 1458-1467; D. B. Payne and J. R. Stern, "Transparent single-mode fiber optical networks," J. Lightwave Tech., LT-4, July, 1986, pp. 864-869). Compared to TDM, WDM can have significant advantages. In particular, wavelength multiplexed channels can be separated and combined passively, independently of the format and bit rate of the data being transmitted.

However, prior art subscriber loop architectures based on WDM have suffered from a number of drawbacks. The most basic technological requirement of any multi-channel WDM system is that the emission wavelengths of the light sources be coordinated and stabilized to maintain a sufficient wavelength separation between the channels. Unfortunately, the emission wavelengths of conventional laser diodes are somewhat unpredictable, owing to variations in operating temperatures, manufacturing procedures and other factors. This uncertainty complicates efforts to perform WDM with a large number of channels as is required in a subscriber loop architecture, particularly if the conventional laser diodes are in many disjoint locations such as at different subscriber premises.

Another problem with prior art subscriber loop architectures based on WDM is the inefficient manner in which channels are distributed to the individual subscribers. Such systems (see, e.g., D. B. Payne and J. R. Stern, "Transparent single-mode fiber optical networks," supra) transmit a fraction of the power from many wavelength channels to each of a plurality of subscriber stations. A filtering operation is then performed at each subscriber station in order to select the proper channel from all the channels received. This arrangement has drawbacks from the point of view of privacy, from the point of view of power budget (i.e. only a limited number of subscriber stations can be serviced when power is divided in this manner), and from the point of view of modularity of design (i.e. different subscriber stations require differently tuned filters, rather than all subscriber stations utilizing the same equipment).

Accordingly, it is an object of the present invention to provide a fiber optic subscriber loop architecture based on WDM which overcomes the shortcomings of prior art fiber optic subscriber loop architectures.

It is a further object of the present invention to develop a fiber optic subscriber loop architecture based on a laser sharing scheme (see, e.g., Cheng, U.S. Pat. No. 4,705,350, Cheng et al., U.S. Pat. No. 4,658,394, Albanese et al., U.S. Pat. No. 4,712,859 and Personick, U.S. Pat. No. 4,642,804) so that a large number of wavelength channels, and thus a large number of subscribers, can be accommodated without problems resulting from the instability of and lack of coordination between the wavelengths emitted by conventional laser diodes.

It is yet a further object of the invention to provide a fiber optic subscriber loop architecture which utilizes no active components outside the central office, which is totally transparent to the bit rates and formats of the data being transmitted, and which is modular in design.

SUMMARY OF THE INVENTION

The present invention is a fiber optic subscriber loop architecture for delivering telecommunications services to a plurality of subscriber premises. The inventive subscriber loop architecture utilizes a double star configuration comprising a Central Office and a plurality of Remote Nodes to which the individual subscribers are connected.

In an illustrative embodiment, the Central Office comprises a first bank of lasers which produces optical power at the wavelengths $\lambda_1, \lambda_2 \ldots \lambda_N$ in a first wavelength band. A second bank of lasers produces optical power at the wavelengths $\lambda_{N+1}, \lambda_{N+2} \ldots \lambda_{2N}$ in a second wavelength band.

The optical power at each wavelength is split into a plurality of signal channels and the channels in the first wavelength band are modulated with downstream subscriber information. The channels in the second wavelength band are transmitted to the subscribers in unmodulated form, modulated at the subscriber premises, and returned to the Central Office.

Illustratively, the Central Office includes a WDM module corresponding to each of the Remote Nodes connected thereto. Each WDM module multiplexes together groups of channels from the first wavelength band to form wavelength multiplexed signals. Each such multiplexed signal comprises one channel corresponding to each wavelength in the first wavelength band. A multiplexed signal comprising one unmodulated channel corresponding to each wavelength from the second wavelength band is also formed by each WDM module. The multiplexed signals produced by the WDM modules are routed via fiber optic cables to the corresponding Remote Nodes.

At the Remote Nodes, the wavelength multiplexed signals received from the Central Office are rearranged through use of a WDM module so that each subscriber premises connected to a Remote Node receives a signal comprising two channels, one modulated channel from the first wavelength band and one unmodulated channel from the second wavelength band. The unmodulated channel is modulated at the subscriber premises and sent back to the Remote Node. The Remote Node wavelength multiplexes groups of these modulated channels from the second wavelength band and routes them back to the Central Office over the connecting fiber cables.

It should be noted that the Remote Nodes comprise purely passive optical devices and perform no electronic processing. It should also be noted that the use of the above-described laser sharing techniques at the Central Office eliminates or reduces problems relating to wavelength stability and coordination between wavelengths.

The inventive subscriber loop architecture described above provides each of a plurality of subscribers with an independent, wideband, bidirectional link to and from the Central Office. Information streams to be transmitted downstream to a given subscriber (e.g., video signals, POTS traffic, data, etc.) can be time multiplexed onto the subscriber's downstream wavelength channel. Information to be transmitted upstream from the subscriber premises (POTs, picture phone, etc.) can be time multiplexed onto the upstream wavelength channel at the subscriber station.

It is a particular advantage of the inventive subscriber loop architecture that there are no active devices in the Remote Nodes. Telephone companies spend enormous sums of money annually on subscriber loop operations including maintenance, testing and adjustments. A subscriber loop architecture that minimizes these recurring expenses will be a more attractive long-term investment than an architecture which perpetuates the occurrence of such expenses by placing elaborate, active hardware at remote sites.

It is also an advantage of the above-described subscriber loop architecture that it can handle a variety of services in a flexible, adaptable manner. The architecture can handle the inevitable heterogeneous customer demands, and even the changes in the services themselves that will inevitably result from the wide scale deployment of optical fibers at customer premises. In the inventive subscriber loop architecture, each customer's link is independent of every other customer's link, allowing for a mix of service offerings with different bit rates. In addition, the Remote Nodes do not have to be adjusted if there is any change in the offered services since they are totally transparent to the actual data being transmitted.

A further advantage of the inventive subscriber loop architecture is that it is a secure architecture. Each subscriber premises receives only channels intended for it. A subscriber premises does not select a particular channel out of many received channels.

The modularity of the inventive subscriber loop architecture is also highly advantageous. Since the geographic density of subscribers varies considerably from place to place, it is preferable to use a subscriber loop architecture which enables the number of subscribers served by a Remote Node site to be increased easily. Thus, in the subscriber loop architecture of the present invention, the number of subscribers serviced by a particular Remote Node site may be easily varied.

Thus, the subscriber loop architecture of the present invention provides significant advantages not found in conventional subscriber loop architectures.

In the embodiment of the invention described above, both the downstream and upstream wavelength sources are located in the Central Office. This arrangement is highly advantageous for the reasons stated above. However, in particular circumstances an alternative embodiment of the invention may be utilized in which each subscriber premises has its own dedicated upstream light source, which upstream light source is illustratively a distributed feedback (DFB) diode laser or an LED. The LED is particularly advantageous as no special temperature drift compensation circuitry may be required.

DETAILED DESCRIPTION OF THE INVENTION

A. OVERVIEW OF THE SUBSCRIBER LOOP ARCHITECTURE

Figure 1:
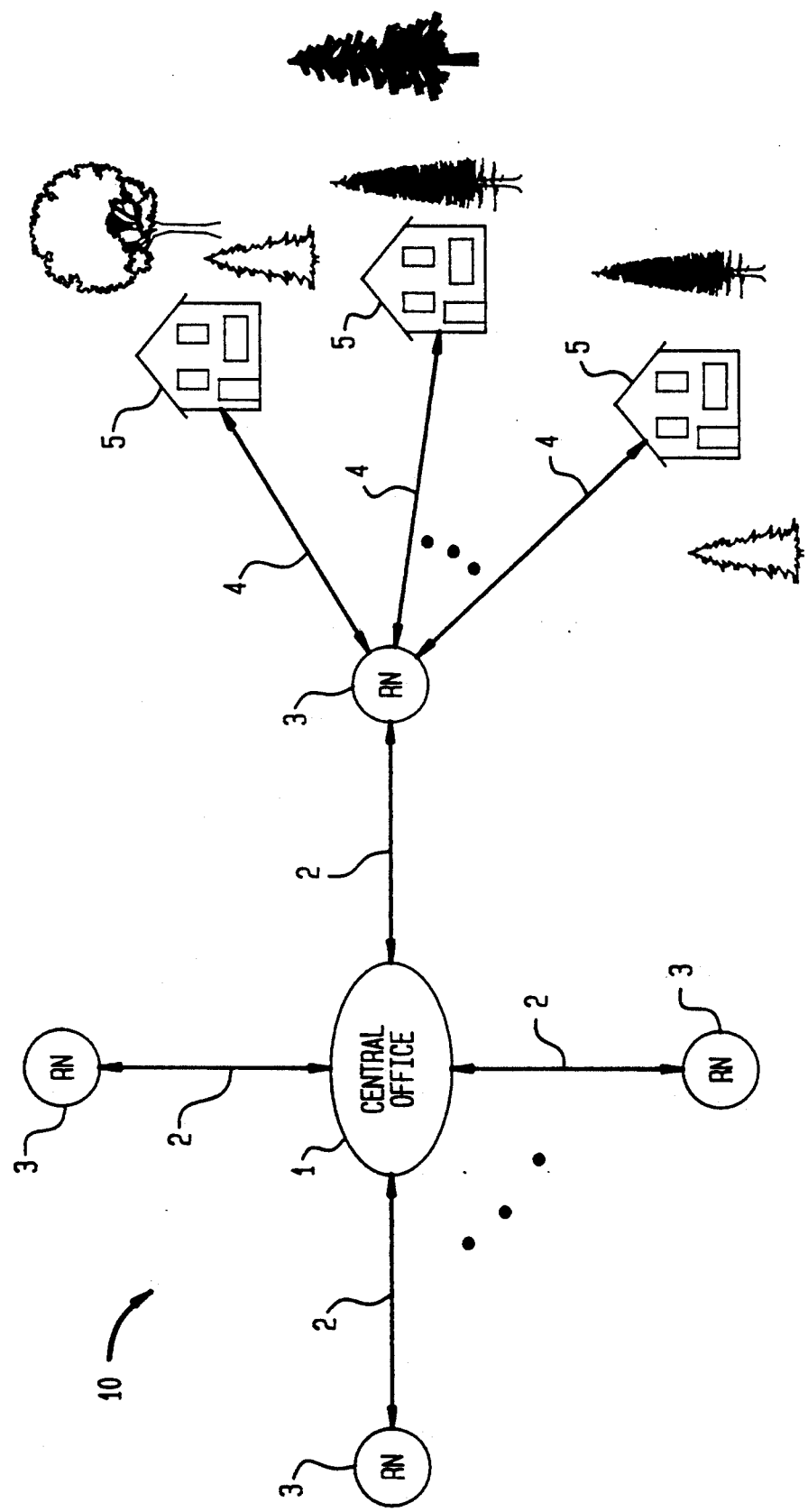
FIG. 1 schematically illustrates a fiber optic subscriber loop architecture utilizing a double-star configuration, in accordance with an illustrative embodiment of the present invention.

Turning to FIG. 1, an overview of a double-star, fiber optic subscriber loop architecture 10 is schematically illustrated. The subscriber loop architecture 10 comprises a Central Office 1. The Central Office 1 is connected by fiber optic feeder cables 2 to a plurality of Remote Nodes (RN) 3. A plurality of individual subscribers 5 are connected via fiber optic cables 4 to each Remote Node 3.

In accordance with the present invention, downstream information is modulated onto particular downstream wavelength channels and transmitted to the Remote Nodes 3 via the fiber cables 2. At the Remote Nodes, this downstream information is distributed to the individual subscribers 5 via the fiber cables 4. Upstream information from the individual subscribers 5 is multiplexed at the Remote Nodes 3 for transmission to the Central Office via the fiber cables 2.

The sections below describe particular implementations for the Central Office and Remote Nodes in accordance with the present invention.

B. Central Office

Figure 2:
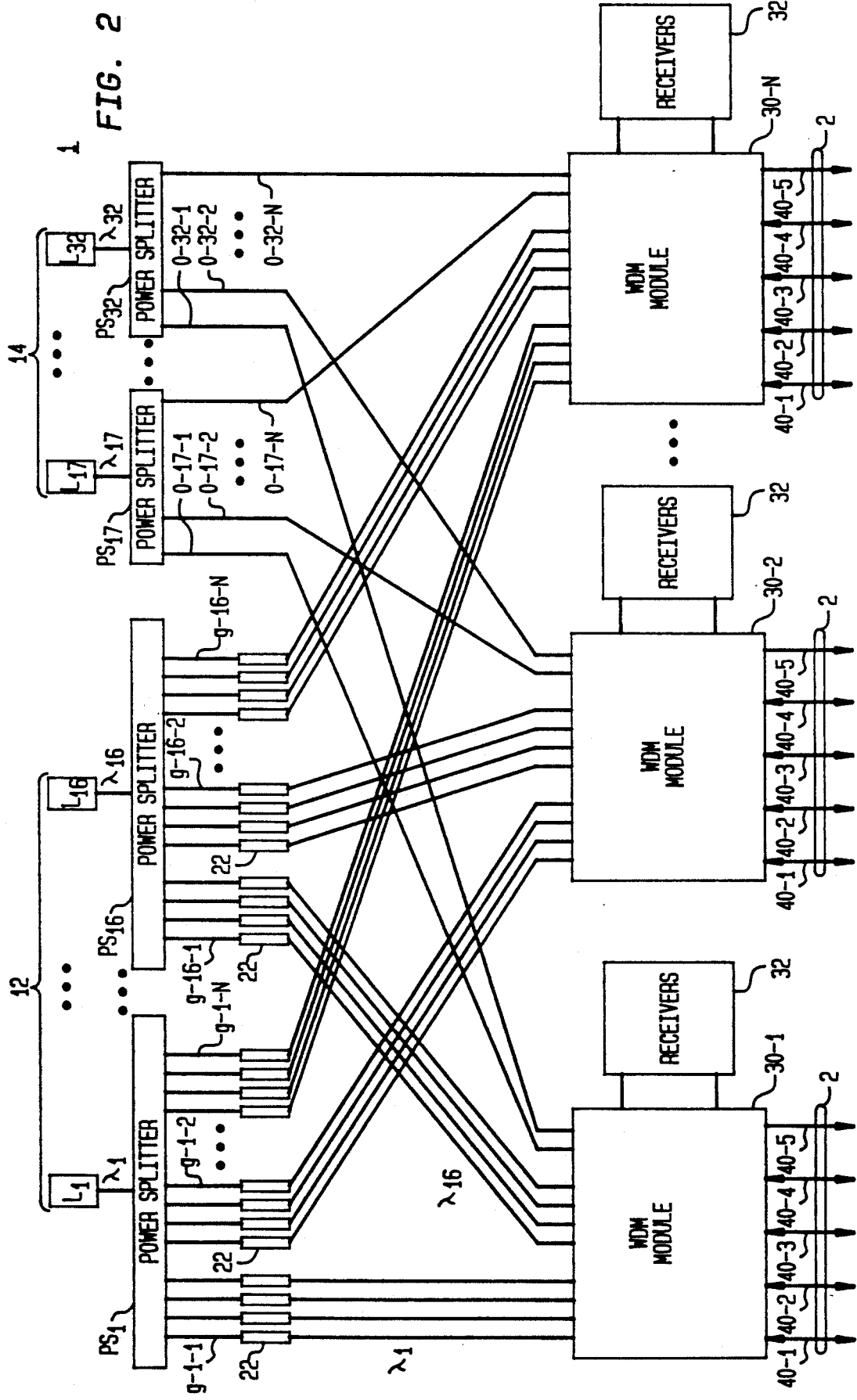
FIG. 2 schematically illustrates a Central Office for use in the subscriber loop architecture of FIG. 1, in accordance with an illustrative embodiment of the present invention.

Turning to FIG. 2, a Central Office 1 for use in the double star subscriber loop architecture 10 of FIG. 1 is illustrated. The Central Office 1 comprises two laser banks. The laser bank 12 comprises lasers $L_1 \ldots L_{16}$. The laser bank 14 comprises lasers $L_{17} \ldots L_{32}$. The lasers $L_1 \ldots L_{16}$ of laser bank 12 produce wavelengths $\lambda_1 \ldots \lambda_{16}$, respectively, all of which are in a first wavelength band centered about 1.3 $\mu$m. The lasers $L_{17} \ldots L_{32}$ of laser bank 14 produce wavelengths $\lambda_{17} \ldots \lambda_{32}$ all of which are in a second wavelength band centered about 1.5 $\mu$. The wavelengths $\mu_1 \ldots \mu_{16}$ are used for downstream communications (i.e. communications between the Central Office and the individual subscribers). The wavelengths $\lambda_{17} \ldots \lambda_{32}$ are used for upstream communications (i.e. communications between the individual subcribers and the Central Office).

Each of the wavelengths $\lambda_1 \ldots \lambda_{16}$ from the laser bank 12 is directed to a corresponding power splitter $PS_1 \ldots PS_{16}$. Similarly, each of the wavelengths $\lambda_{17} \ldots \lambda_{32}$ is directed to a corresponding power splitter $PS_{17} \ldots PS_{32}$.

Each of the splitters $PS_1 \ldots PS_{16}$ has 4N outputs where N is the number of Remote Nodes served by the Central Office 1 of FIG. 2. More particularly, the outputs of each splitter $PS_1 \ldots PS_{16}$ are arranged in N groups of four outputs each. In FIG. 2, these groups are designated as G-i-j which indicates the $j^{th}$ output group of the $i^{th}$ splitter. Thus, G-1-2 is the second group of four outputs of the splitter $PS_1$. Each of the outputs of the splitters $PS_1 \ldots PS_{16}$ is connected to an external modulator 22 which serves to encode information onto the channel produced at the corresponding splitter output. Each modulator 22 serves to encode information destined to a different subscriber connected to one of the Remote Nodes 3 associated with the Central Office 1 (see FIG. 1).

Each of the splitters $PS_{17} \ldots PS_{32}$ has N outputs designated as O-i-j which indicates the $j^{th}$ output of the $i^{th}$ splitter. Thus, O-17-2 indicates the second output of the power splitter $PS_{17}$.

The Central Office 1 of FIG. 2 includes N WDM modules 30-1, 30-2 ... 30-N. (The WDM module 30 is discussed in greater detail below in connection with FIG. 3). There is one such WDM module 30 in the Central Office 1 for each Remote Node associated therewith. In the double-star subscriber loop architecture of FIG. 1, four Remote Nodes 3 are associated with the Central Office 1 so that in the configuration of FIG. 1, N=4. Each WDM module 30 receives one group of outputs G-i-j from each splitter $PS_1 \ldots PS_{16}$. Thus, the first group of four outputs from each of the splitters $PS_1 \ldots PS_{16}$ is directed to WDM module 30-1. The second group of four outputs from each of the splitters $PS_1 \ldots PS_{16}$ is connected to the WDM module 30-2. The $N^{th}$ group of four outputs from each of the splitters $PS_1 \ldots PS_{16}$ is connected to the $N^{th}$ WDM module 30-N. Also connected to each WDM module 30-1 ... 30-N is one output from each of the splitters $PS_{17} \ldots PS_{32}$.

In short, each WDM module 30 has a total of 80 inputs. There are four inputs allocated to each of the wavelengths $\lambda_1 \ldots \lambda_{16}$ and one input allocated to each of the wavelengths $\lambda_{17} \ldots \lambda_{32}$. (The inputs of a WDM module 30 are shown in greater detail in FIG. 3).

Each WDM module 30 has five output fibers 40-1, 40-2, 40-3, 40-4, 40-5. Each set of five fibers 40-1, 40-2, 40-3, 40-4, 40-5 forms one of the fiber cables 2 of FIG. 1 which connects the Central Office 1 to a corresponding Remote Node 3.

The wavelength channels received at the inputs to the WDM modules 30 are rearranged by wavelength multiplexer devices contained therein. Each of the first four output fibers 40-1, 40-2, 40-3, 40-4 from each WDM module 30 carries downstream to a Remote Node a wavelength multiplexed signal comprising sixteen wavelength channels, with one channel corresponding to each of the wavelengths $\lambda_1 \ldots \lambda_{16}$ in the 1.3 $\mu$m wavelength band. Thus, leaving each WDM module for a corresponding Remote Node is a total of sixty-four modulated channels in the 1.3 $\mu$m wavelength band (i.e. four fibers 40-1, 40-2, 40-3, 40-4 times sixteen channels per fiber). Accordingly, each Remote Node receives sixty-four wavelength channels in the 1.3 $\mu$m wavelength band, which are then distributed by the Remote Node to its associated sixty-four subscribers.

The fiber 40-5 carries sixteen unmodulated wavelength channels corresponding to the wavelengths $\lambda_{17} \ldots \lambda_{32}$ of the 1.5 $\mu$m wavelength band. These unmodulated wavelength channels are split and distributed by the Remote Node to its associated subscribers. The channels corresponding to the wavelengths $\lambda_{17} \ldots \lambda_{32}$ are modulated at the subscriber premises, multiplexed at the Remote Node, and returned to the central office 1 via the fibers 40-1, 40-2, 40-3, 40-4.

Thus, the fibers 40-1, 40-2, 40-3, 40-4 are bidirectional fibers. They transmit modulated wavelength channels corresponding to the wavelengths $\lambda_1 \ldots \lambda_{16}$ in the downstream direction from the Central Office to the Remote Nodes and they transmit modulated wavelength channels corresponding to the wavelengths $\lambda_{17} \ldots \lambda_{32}$ in the upstream direction from the Remote Nodes to the Central Office. The fibers 40-5 are unidirectional, i.e. they only transmit unmodulated channels corresponding to the wavelengths $\lambda_{17} \ldots \lambda_{32}$ in the downstream direction. When received at the Central Office 1, the modulated wavelength channels corresponding to the wavelengths $\lambda_{17} \ldots \lambda_{32}$ are passed by the appropriate WDM modules 30 to the associated receivers 32.

C. WDM Module

Figure 3:
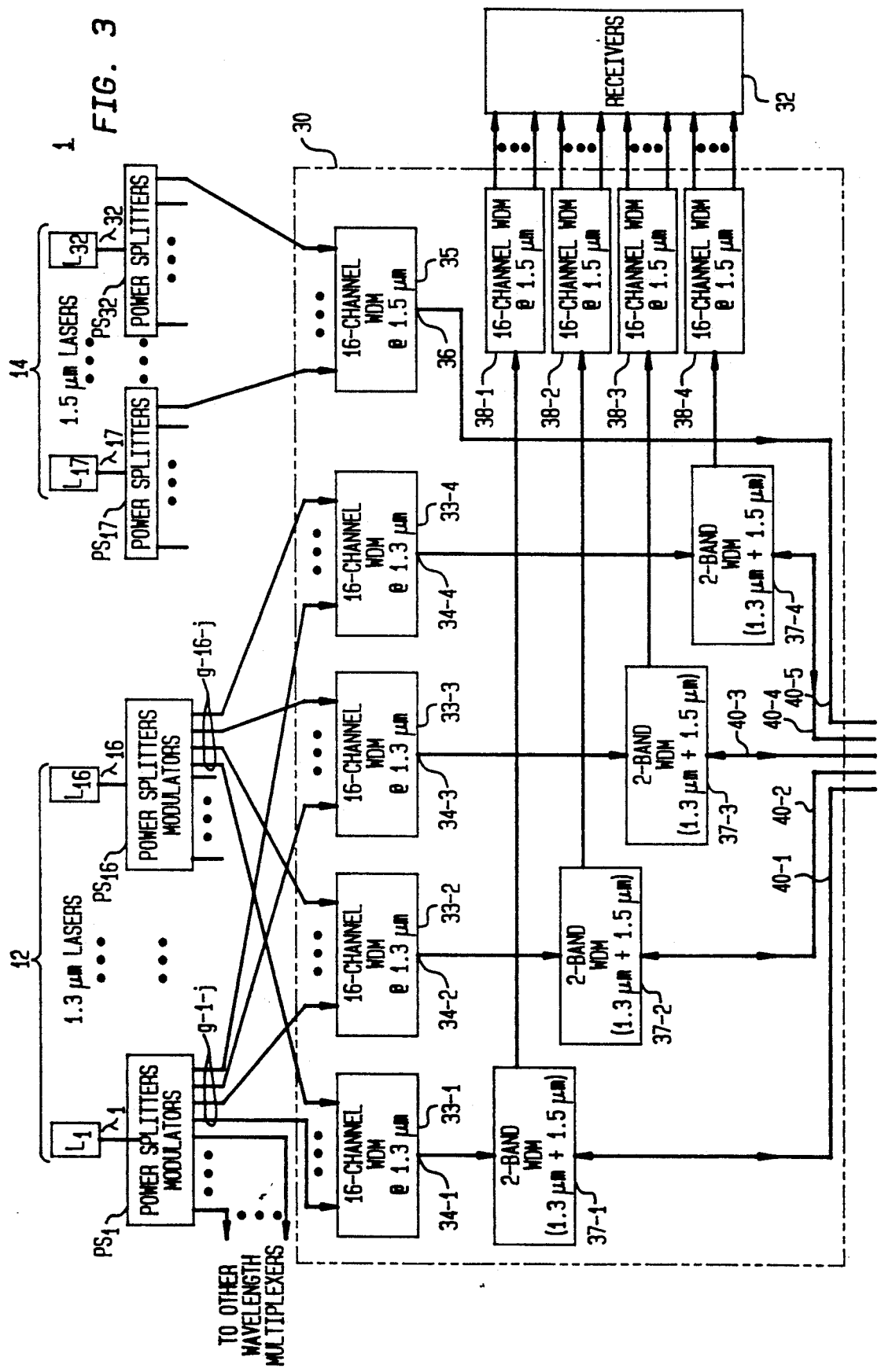
FIG. 3 schematically illustrates a WDM module for use in the Central Office of FIG. 2.

One of the WDM modules 30 of the Central Office 1 of FIG. 2 is shown in greater detail in FIG. 3. Common elements in FIGS. 2 and 3 have the same identifying numerals. Note that in FIG. 3, the external modulators 22 of FIG. 2 are omitted for purposes of clarity.

As shown in FIG. 3, the WDM module 30 include four sixteen-channel WDM devices 33-1, 33-2, 33-3, 33-4. Each of the devices 33-1, 33-2, 33-3, 33-4 has sixteen inputs, with one of the inputs being connected to each splitter $PS_1 \ldots PS_{16}$. In other words, one group G-i-j of four outputs from each splitter $PS_1 \ldots PS_{16}$ is connected to the WDM module 30 of FIG. 3, with one output from each group being connected to each device 33-1, 33-2, 33-3, 33-4. Thus, each of the devices 33-1, 33-2, 33-3, 33-4 receives a modulated wavelength channel corresponding to each of the wavelengths $\lambda_1 \ldots \lambda_{16}$ of the 1.3 $\mu$m wavelength band. At the outputs 34-1, 34-2, 34-3, 34-4 of the devices 33-1, 33-2, 33-3, 33-4 a multiplexed signal containing sixteen wavelength channels corresponding to the wavelengths $\lambda_1 \ldots \lambda_{16}$ is present, for a total, as indicated above, of sixty-four modulated channels.

The WDM module 30 also includes the sixteen-channel WDM device 35. The WDM device 35 has 16 inputs, each of which is connected to one output of the splitters $PS_{17} \ldots PS_{32}$, respectively. Thus, the WDM device 35 receives an unmodulated wavelength channel at each of the wavelengths $\lambda_{17} \ldots \lambda_{32}$ in the 1.5 $\mu$m wavelength band and produces a multiplexed signal comprising sixteen unmodulated channels in the 1.5 $\mu$m wavelength band at its output 36.

The multiplexed signal comprising the unmodulated wavelength channels in the 1.5 $\mu$m band is transmitted via the fiber 40-5 to the corresponding Remote Node (see FIG. 1). The multiplexed signals comprising the modulated channels in the 1.3 $\mu$m band are transmitted via the fibers 40-1, 40-2, 40-3, 40-4 to the corresponding Remote Node (see FIG. 1).

Note that the optical fibers 40-1, 40-2, 40-3, 40-4 connect to the 2-band WDM devices 37-1, 37-2, 37-3, 37-4. As indicated above, each of the fibers 40-1, 40-2, 40-3, 40-4, in addition to transmitting a downstream multiplexed signal in the 1.3$\mu$ band, also transmits an upstream multiplexed signal comprising sixteen modulated channels corresponding to the wavelengths $\lambda_{17} \ldots \lambda_{32}$ in the 1.5 $\mu$m band. Two multiplexed signals—one in the 1.3 $\mu$m band and comprising sixteen modulated channels corresponding to $\lambda_1 \ldots \lambda_{16}$ and the other in the 1.5 $\mu$m band and comprising sixteen modulated channels corresponding to $\lambda_{17} \ldots \lambda_{32}$—are multiplexed/demultiplexed using the WDM devices 37-1, 37-2, 37-3, 37-4. The upstream multiplexed signals in the 1.5 $\mu$m band are then transmitted to the 16-channel WDM devices 38-1, 38-2, 38-3, 38-4 wherein the upstream multiplexed signals in the 1.5 $\mu$m band are demultiplexed into individual channels corresponding to $\lambda_{17} \ldots \lambda_{32}$. The information encoded on the individual upstream channels is then detected by the receivers 32. Thus, the 2-band WDM devices 37-1, 37-2, 37-3, 37-4 do not serve to separate multiplexed signals into individual wavelength channels, but instead serve to separate or combine multiplexed signals from two distinct wavelength bands, each of which multiplexed signals itself comprises a plurality of individual wavelength channels.

This completes the description of the Central Office 1 of FIG. 1. In the next section below, an illustrative embodiment of a Remote Node 3 of FIG. 1 is discussed.

D. Remote Node

Figure 4:
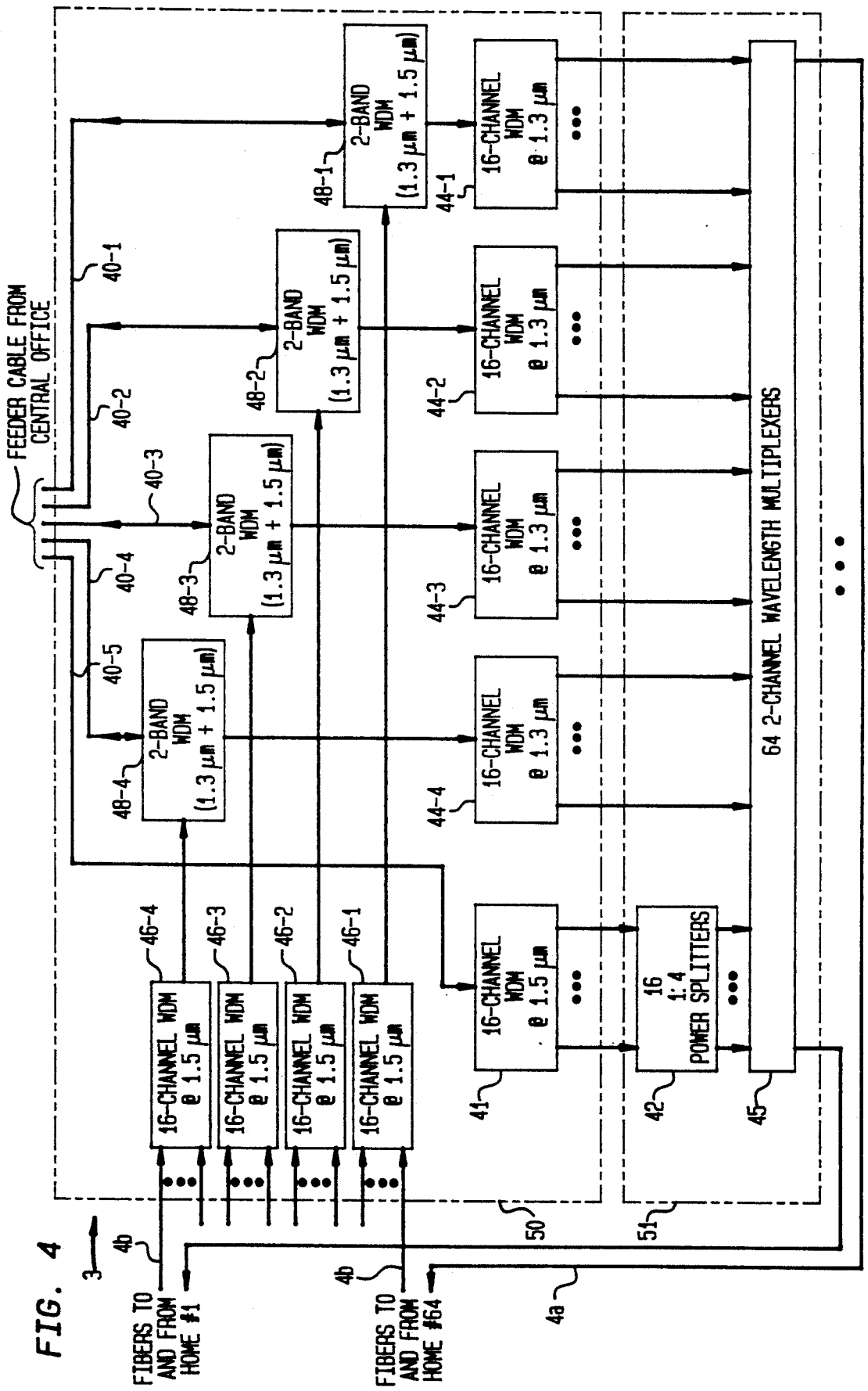
FIG. 4 schematically illustrates a Remote Node for use in the subscriber loop architecture of FIG. 1, in accordance with an illustrative embodiment of the present invention.

Turning to FIG. 4, a Remote Node 3 (see FIG. 1) is illustrated. The Remote Node 3 of FIG. 4 is connected to a WDM module 30 (see FIGS. 2 and 3) of the Central Office 1 (see FIGS. 1, 2 and 3) via a fiber cable 2 which comprises fibers 40-1, 40-2, 40-3, 40-4, 40-5.

As indicated above, a multiplexed signal comprising sixteen unmodulated wavelength channels corresponding to wavelengths $\lambda_{17} \ldots \lambda_{32}$ is transmitted via the fiber 40-5 from the WDM module 30 (FIG. 3) to the Remote Node 3 (FIG. 4). This multiplexed signal is demultiplexed using the WDM device 41 into its sixteen individual channels. Each individual channel is then split into four channels using the splitter 42 to produce sixty-four unmodulated channels in the 1.5 $\mu$m wavelength band.

As indicated above, each of the fibers 40-1, 40-2, 40-3, 40-4 transmits a multiplexed signal in the 1.3 $\mu$m band comprising sixteen modulated channels corresponding to the wavelengths $\lambda_1 \ldots \lambda_{16}$. These multiplexed signals are processed by the WDM devices 43-1, 43-2, 43-3, 43-4 (to be discussed below) and demultiplexed into their individual wavelength channels by the WDM devices 44-1, 44-2, 44-3, 44-4.

The Remote Node 3 of FIG. 4 also comprises sixty-four two-channel multiplexers 45. Each of these devices combines one unmodulated channel in the 1.5 $\mu$m band from the splitter 42 with a modulated downstream channel in the 1.3 $\mu$m band from one of the WDM devices 44-1, 44-2, 44-3, 44-2. One such multiplexed channel pair is transmitted to each of sixty-four subscriber premises 5 (see FIG. 1) via an optical fiber 4a.

At the subscriber premises (not shown in FIG. 4), the unmodulated channels in the 1.5 $\mu$m band are modulated with upstream information and returned to the Remote Node 3 of FIG. 4 via the fibers 4b. (One fiber 4a and one fiber 4b together form a fiber cable 4 of FIG. 1). Groups of sixteen modulated upstream channels arriving via the fibers 4b are multiplexed together using the 16-channel WDM devices 46-1, 46-2, 46-3, 46-4. The resulting upstream multiplexed signals in the 1.5 $\mu$m wavelength band are themselves multiplexed together with the downstream multiplexed signals in the 1.3 $\mu$m through use of the 2-band WDM devices 43-1, 43-2, 43-3, 43-4 for transmission to the Central Office 1 via the fibers 40-1, 40-2, 40-3, 40-4.

Note that the Remote Node 3 may be viewed are comprising two modules. One of the modules is a WDM module 50 and the other is a power splitter and multiplexer module 51. Because the WDM devices 33, 35, 37, 38 of the WDM module 30 of FIG. 3 and the respective WDM devices 44, 41, 43 and 46 of the module 50 of FIG. 4 are bidirectional (i.e. they may be used as a multiplexer or demultiplexer depending on which end is used for the inputs and which end is used for the outputs), the WDM module 30 of FIGS. 2 and 3 is exactly identical to the WDM module 50 of FIG. 4. This provides an attractive modularity which should aid in mass production efforts of the inventive subscriber loop architecture. In particular, the WDM module 30, 50 comprise only three different types of components: a 16-channel multiplexer/demultiplexer for the 1.3 μm band (33, 44), a 16-channel multiplexer/demultiplexer for the 1.5 μm band (38, 46) and the 2-band WDM devices (37, 43).

As previously indicated, the fiber optic subscriber loop architecture described above has several significant advantages. Firstly, the architecture includes no active devices at the Remote Nodes, thus minimizing loop maintenance expenses for the telephone companies. Secondly, the loop architecture is completely independent of the bit rate and format of the data being transmitted so that the loop architecture can be used for a wide variety of services as services offerings change. Lastly, the modularity of the design is highly advantageous. Since the geographic density of subscribers varies considerably from place to place, it is desirable to utilize a loop architecture that permits flexibility in the number of subscribers served by a Remote Node. Illustratively, the Remote Node 3 of FIG. 4 serves sixty-four subscribers. If it is desired to serve M×64 subscribers from the same remote site, additional modular units 50, 51 are used at the site. Accordingly, the cost of the composite node scales approximately linearly with the number of subscribers served.

E. Alternative Embodiments

The fiber optic subscriber loop architecture described in connection with FIGS. 2-4 utilizes active devices in connection with a laser sharing scheme and only in the Central Office. There are no active devices at the Remote Nodes. This laser sharing scheme mitigates problems related to wavelength stabilization and coordination which have plagued previous subscriber loop architectures based on WDM.

In addition, the laser sharing scheme described above enables all subscriber premises to use identical optical transceivers even though different wavelengths are assigned. However, there is a significant hardware cost overhead associated with the distribution of unmodulated power from the Central Office to the subscriber premises for modulation with upstream information at the subscriber premises. Thus, in particular circumstances it may be desirable to deploy a subscriber loop architecture in which individual light sources are utilized at the subscriber premises. Such light sources may be distributed feedback (DFB) diode lasers or light emitting diodes (LEDs). The DFB laser's narrow line width and ability to be temperature stabilized make it a strong candidate for dense WDM systems without problems relating to wavelengths stability and coordination.

Figure 5:
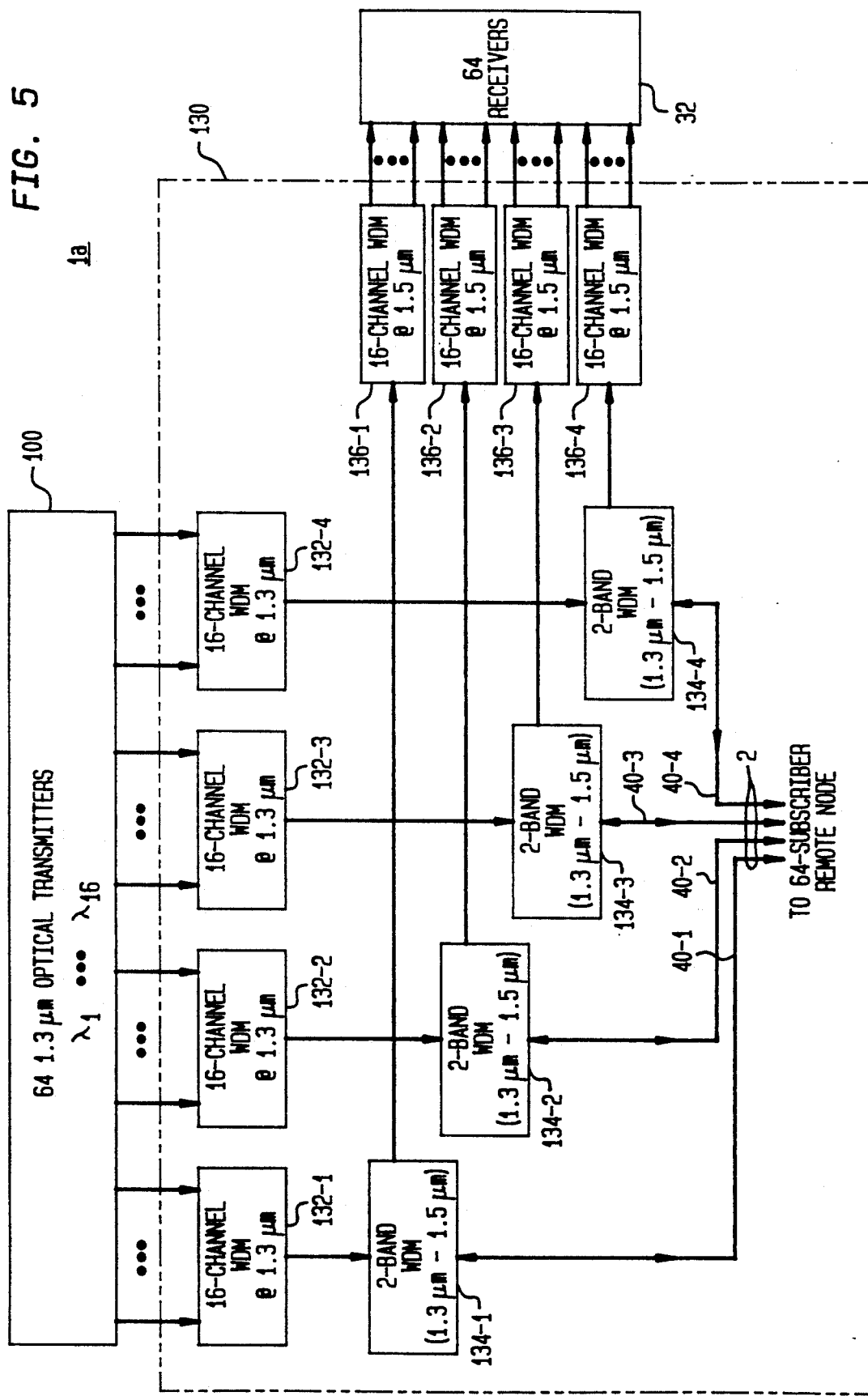
FIGS. 5 and 6 schematically illustrate an alternative Central Office and Remote Node for use in the subscriber loop architecture of FIG. 1, in accordance with an alternative illustrative embodiment of the present invention.
Figure 6:
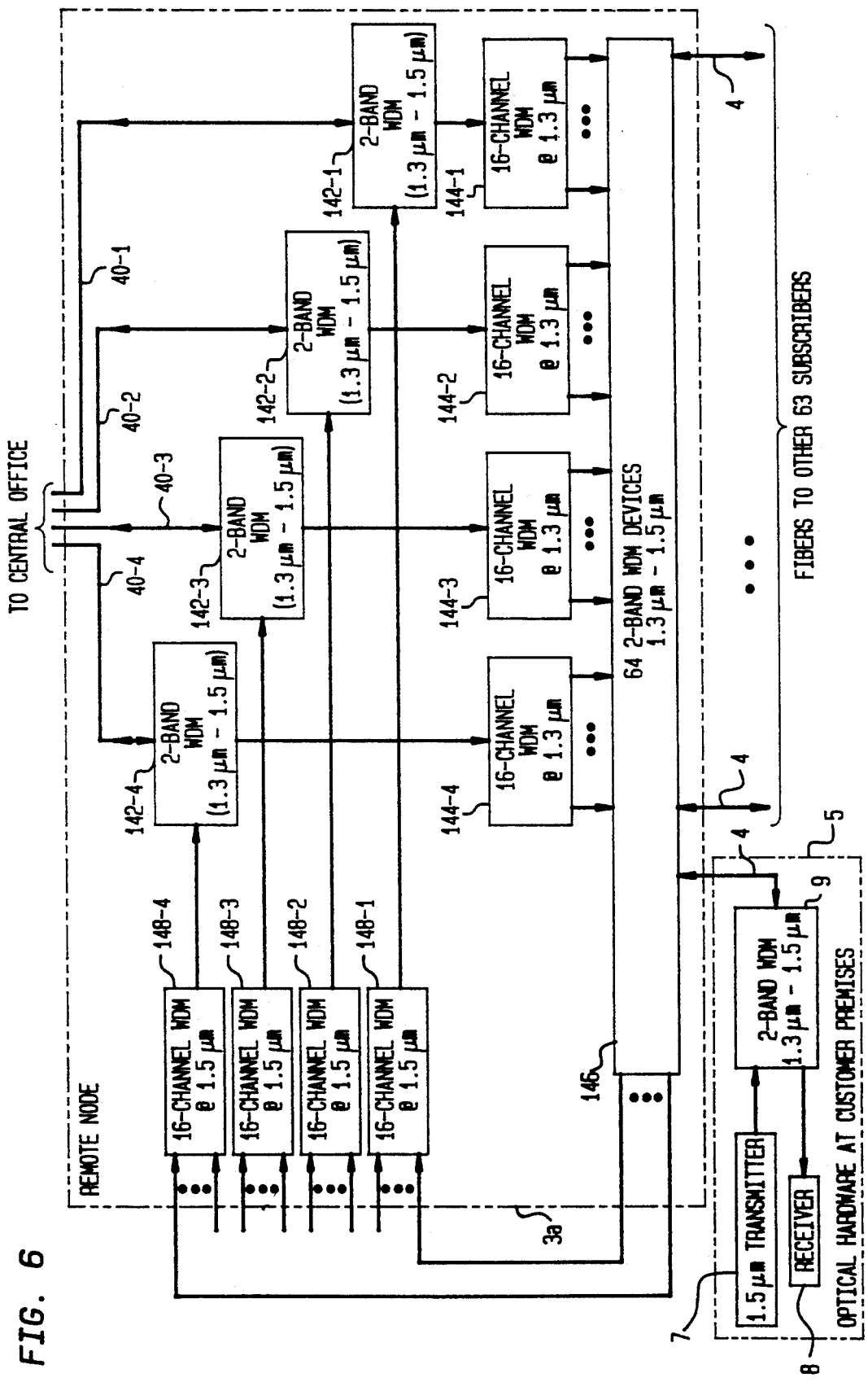

FIGS. 5 and 6 show a Central Office and a Remote Node for use in a double-star fiber optic subscriber loop architecture (see FIG. 1) wherein each subscriber premises includes a dedicated DFB laser in the 1.5 μm wavelength band. Like elements in FIGS. 1-4 and 5-6 have the same identifying numerals.

The Central Office 1a of FIG. 5 is similar to the central office of FIG. 2, except that there is no hardware for generating and transmitting unmodulated optical channels downstream from the Central Office to the Remote Nodes, and the use of laser sharing is eliminated. In the Central Office 1a of FIG. 6, light sources and a WDM module for servicing one Remote Node only is illustrated. However, other Remote Nodes may be serviced with the addition of other light sources and other WDM modules.

Thus, the Central Office 1a of FIG. 6 comprises the optical power source 100 and the WDM module 130. The optical power source 100 illustratively comprises 64 DFB lasers. More particularly, the power source 100 comprises four DFB lasers at each of sixteen wavelengths $\lambda_1, \ldots \lambda_{16}$ in the 1.3 μm wavelength band for a total of sixty-four channels. Illustratively, the lasers comprising the optical power source 100 are directly modulated thus eliminating use of the external modulators 22 of FIG. 2.

The WDM module 130 includes four 16-channel WDM devices 132-1, 132-2, 132-3, 132-4 for the use in the 1.3 μm wavelength band. Each of the WDM devices 132-1, 132-2, 132-3, 132-4 receives a modulated wavelength channel at each of the wavelengths $\lambda_1, \ldots \lambda_{16}$ and multiplexes them together to produce a multiplexed signal in the 1.3 μm band.

Since no unmodulated power is transmitted between the Central Office 1a of FIG. 5 and the associated Remote Node (see FIG. 6), the fiber cable 2 comprises only four optical fibers 40-1, 40-2, 40-3, 40-4. Each of the fibers 40-1, 40-2, 40-3, 40-4 transmits a multiplexed signal in the 1.3 μmband comprising sixteen modulated channels from one of the devices 132 to the Remote Node.

Each of the fibers 40-1, 40-2, 40-3, 40-4 also carries an upstream sixteen channel multiplexed signal in the 1.5 μmband. The individual channels in the 1.5 μm band are produced in the individual subscriber premises and are multiplexed in the Remote Node. The two-band WDM devices 134-1, 134-2, 134-3, 134-4 multiplex/demultiplex the downstream 1.3 μm band signals and the upstream 1.5 μm band signals. The signals in the 1.5 μm band are directed to the 16-channel WDM devices 136-1, 136-2, 136-3, 136-4 where they are demultiplexed into the individual 1.5 μm wavelength channels. The sixty-four individual channels in the of 1.5 μm band are then detected by the receivers 32.

The Remote Node 3a associated with the Central Office 1a of FIG. 5 is schematically illustrated in FIG. 6.

The fiber cable leading to the Remote Node 3a of FIG. 6 comprises the fibers 40-1, 40-2, 40-3, 40-4. As indicated above, in the downstream direction, each of these fibers carries a multiplexed signal comprising 16 modulated channels in the 1.3 μm wavelength band corresponding to the wavelengths $\lambda_1, \lambda_2 \ldots \lambda_{16}$. These downstream multiplexed signals are passively processed by the 2-band WDM devices 142-1, 142-2, 142-3, 142-4 (to be discussed below) and are demultiplexed by the 16-channel WDM devices 144-1, 144-2, 144-3, 144-4 so as to produce sixty-four individual modulated channels in the .ps 101.3 μm wavelength band, one for each of sixty-four individual subscriber premises 5 served by the Remote Node 3a of FIG. 6.

The individual downstream channels are each transmitted to one of the subscriber premises 5 via an optical fiber 4 for detection by a receiver 8 located at the subscriber premises 5. Note, the optical fiber 4 transmits a downstream channel in the 1.3 μm band to each subscriber premises 5 and a modulated upstream channel in the 1.5 μm band from the subscriber premises 5 to the Remote Node. The upstream channel in the 1.5 μm band is generated at the subscriber premises 5 by the transmitter 7 which illustratively comprises a temperature stabilized DFB laser. Because the fibers 4 are used bidirectionally, the Remote Node of FIG. 6 comprises the sixty-four, 2-band WDM devices 146 and each subscriber premises 5 includes a 2-band WDM device 9.

The individual upstream channels in the 1.5 μm wavelength band leaving the 2-band WDM devices 146 are multiplexed by the 16-channel 1.5 μm band WDM devices 148-1, 148-2, 148-3, 148-2. The resulting upstream multiplexed signals in the 1.5 μm band are multiplexed with the 1.3 μm downstream multiplexed signals using the devices 142-1, 142-2, 142-3, 142-4 for transmission upstream to the Central Office 1a of FIG. 5 via the fibers 40-1, 40-2, 40-3, 40-4.

Figure 7:
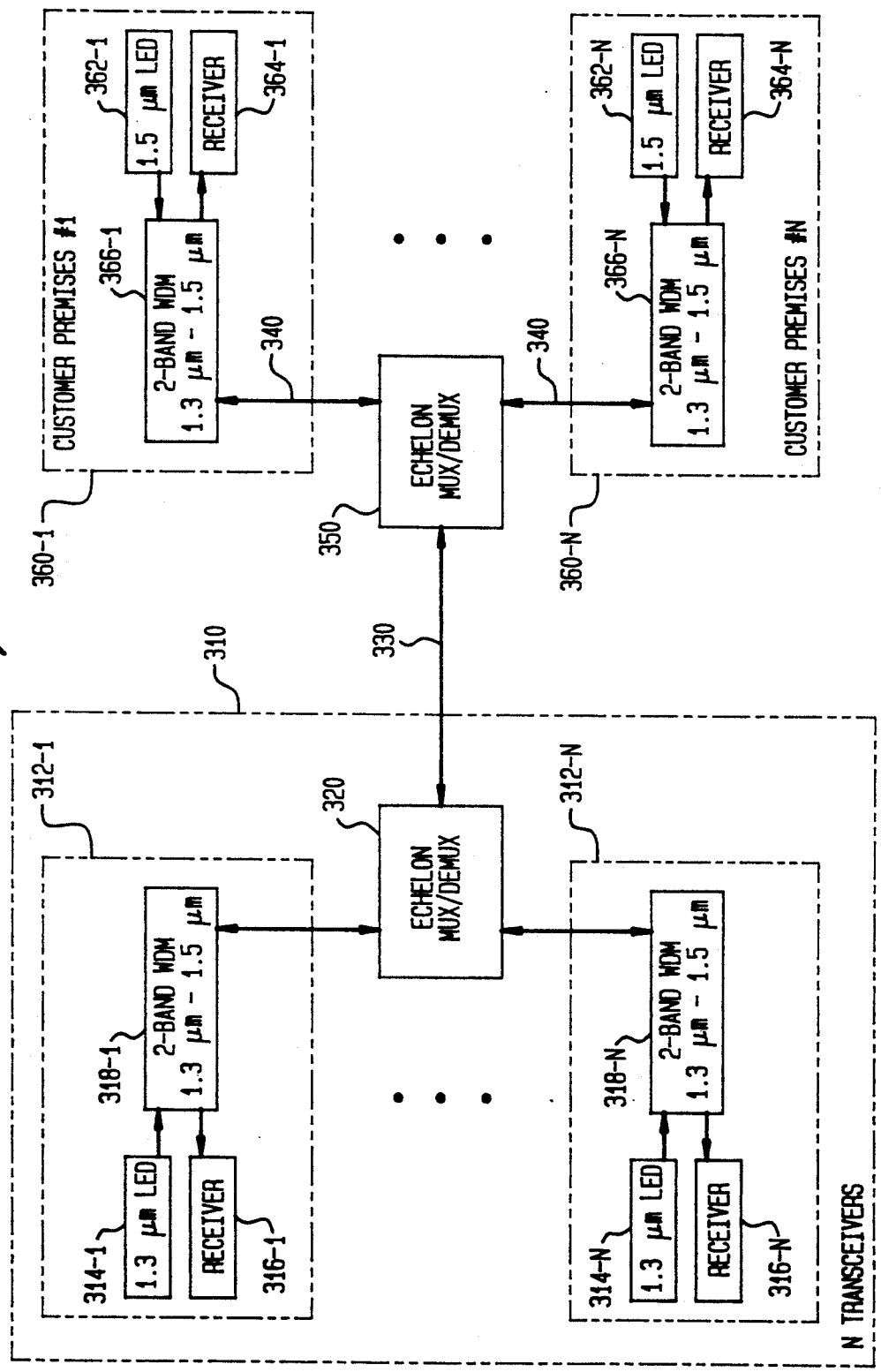
FIG. 7 schematically illustrates an alternative fiber optic subscriber loop architecture, in accordance with an alternative illustrative embodiment of the present invention.

FIG. 7 schematically illustrates an alternative subscriber loop architecture wherein the Central Office and each subscriber premises includes a wide band emitting LED. While a light source such as an LED whose emission spectrum is wide compared to the desired channel separation is usually considered inappropriate for use in dense WDM systems, the LED's spectral characteristics actually prove to be advantageous when used in the fiber optic subscriber loop architecture of FIG. 7. Instead of using LEDs, the subscriber loop architecture of FIG. 7 may also be implemented using narrow band DFB lasers in the central office and at the subscriber premises.

Turning to FIG. 7, the subscriber loop architecture 300 comprises a central office 310, one Remote Node 350, and a plurality of subscriber premises 360-1 . . . 360-N.

The central office 310 comprises transceivers 312-1 . . . 312-N. Each transceiver 312-1 . . . 312-N comprises a directly modulated LED 314-1 . . . 314-N emitting in the 1.3 μm band for forming a downstream channel. Each transceiver 312-1 . . . 312-N also comprises a receiver 316-1 . . . 316-N for receiving an upstream channel in the 1.5 μm band and a 2-band WDM device 318-1 . . . 318-N for multiplexing/demultiplexing the upstream 1.5 μm band channel and the downstream 1.3 μm band channel.

Instead of the type of WDM modules illustrated in FIGS. 2, 3, 4, 5, and 6, the central office 310 of FIG. 7 utilizes an echelon multiplexer/demultiplexer unit 320. The unit 320 multiplexes together the downstream channels produced by the transceivers 312-1 . . . 312-N for transmission via optical fiber cable 330 to the Remote Node 350. The unit 320 also demultiplexes N upstream channels received at the Central Office 310 via the fiber cable 330 for distribution to the individual transceiver units 312-1 . . . 312-N. Illustratively, the unit 320 of FIG. 8 is formed using echelon (i.e. coarse) gratings which can perform multi-channel wavelength operations in the 1.3 μm and 1.5 μm B bands simultaneously (see e.g. D. H. McMahon "Echelon Grating Multiplexers for Hierarchically Multiplexed Fiber Optic Communication Networks", Appl. Opt.26 Jun. 1, 1987, pp. 2188-2196). In contrast, in the WDM modules of FIGS. 2, 3, 4, 5, and 6, one set of WDM devices is used to demultiplex individual channels of one wavelength band and another set of WDM devices is used to multiplex individual channels of a second wavelength band. Illustratively, in the subscriber loop architecture 300 of FIG. 7, N=64, i.e., there are sixty-four downstream channels in the 1.3 μm band and sixty-four upstream channels in the 1.5 μm band. Thus, the unit 320 can be formed using four, sixteen-channel echelon gratings.

The Remote Node 350 can also be formed using echelon gratings. These gratings serve to demultiplex the N downstream channels in the 1.3 μm band for distribution to the individual subscribers 360-1 . . . 360-N and to multiplex the upstream channels in the 1.5 μm band for transmission to the Central Office.

Each subscriber premises 360-1 . . . 360-N comprises an LED 362-1 . . . 362-N in the 1.5 μm band for forming an upstream channel. Each subscriber premises also includes a receiver 364-1 . . . 364-N for receiving a channel in the 1.3 μm band and a 2-band WDM device 366-1 . . . 366-N for multiplexing/demultiplexing an upstream channel in the 1.5 μm band and a downstream channel in the 1.3 μm band for transmission to/from the Remote Node 350 via the fiber 340.

In comparison with DFB laser diodes, the use of LED light sources in the transceivers 312-1 . . . 312-N, 360-1 . . . 360-1 provides a particular advantage in that LEDs exhibit significantly reduced temperature stabilization problems. A DFB laser has a very narrow emission bandwidth which is temperature sensitive. Thus, in the absence of relatively complex temperature stabilization circuitry, a change in temperature might cause a shift in the emission bandwidth of a DFB laser in one of the transceiver's 312-1 . . . 312-N, 360-1 . . . 360-N so that the relatively narrow emission bandwidth does not coincide with the channel defined in the corresponding WDM device 318-1 . . . 318-N, 366-1 . . . 366-N.

In contrast, the emission bandwidth of an LED such as the LEDs 314-1 . . . 314-N, is very wide, much wider than the channels defined in the corresponding WDM devices 318-1 . . . 318-N, 366-1 . . . 366-N. Thus, if there is a shift in the emission bandwidth due to a change in temperature, there will be some fraction of the bandwidth which coincides with the channel defined by the corresponding WDM device, thereby eliminating or reducing the need for temerature stabilization circuitry.

A further advantage of the use of LEDs in the subscriber loop architecture 300 of FIG. 7 is that all of the transceivers in the Central Office are identical and all of the transceivers at the subscriber premises are identical.

Conclusion

A number of embodiments of a fiber optic subscriber loop architecture utilizing dense WDM have been disclosed. These embodiments are intended to be illustrative only. Numerous alternative embodiments of the present invention may be devised without departing from the spirit and scope of the following claims.

What is claimed is:

1. A double-star fiber optic subscriber loop architecture comprising:
   a central office,
   a plurality of passive, all optical remote nodes connected to the central office, and
   a plurality of subscriber premises connected to each remote node,
   said central office comprising means for generating a plurality of modulated wavelength channels in a first wavelength band, means for generating a plurality of unmodulated wavelength channels in a second wavelength band, and wavelength division multiplexing means for forming multiplexed signals each comprising a group of modulated or unmodulated channels from said first or second wavelength bands, respectively, to be transmitted to said remote nodes, wherein said plurality of wavelength channels in said first wavelength band is generated by a first bank of lasers, a power splitter associated with each laser in the first bank, and an external modulator associated with each output of each power splitter, each said passive remote nodes including means for receiving a plurality of said multiplexed signals from said central office and optical means for passively processing said received multiplexed signals in optical form so that each subscriber premises receives one modulated channel from said first wavelength band and one unmodulated channel from said second wavelength.

2. The architecture of claim 1 wherein each of said remote nodes further comprises means for receiving modulated channels in said second wavelength band from the subscriber premises associated therewith and means for multiplexing groups of said modulated channels of said second wavelength band to form multiplexed signals for transmission to said central office.

3. The architecture of claim 2 wherein said multiplexed signals comprising modulated channels in said second wavelength band are transmitted from said passive remote nodes to said central office via the same optical fibers used to transmit said multiplexed signals comprising modulated channels in said first wavelength band from said central office to said remote nodes.

4. The architecture of claim 3 wherein said wavelength division multiplexing means of said central office and said processing means of said passive remote nodes in WDM devices for multiplexing/demultiplexing wavelength multiplexed signals in said first and second wavelength bands.

5. The architecture of claim 4 wherein said wavelength division multiplexing means of said central office includes a plurality of devices for separating said multiplexed signals in said second wavelength band received from said passive remote nodes into a plurality of individual channels.

6. The architecture of claim 1 wherein said unmodulated channels in said second wavelength band are generated by a second bank of lasers and a power splitter associated with each of said lasers in said second bank.

7. A double-star fiber optic subscriber loop architecture comprising
a central office,
a plurality of passive, all-optical remote nodes connected to the central office, and
a plurality of subscriber premises connected to each passive remote node,
said central office comprising means for generating a plurality of modulated wavelength channels in a first wavelength band, means for generating a plurality of unmodulated wavelength channels in a second wavelength band, and wavelength division multiplexing means for forming multiplexed signals each comprising a group of modulated or unmodulated channels from said first or second wavelength band, respectively, to be transmitted to one of said passive remote nodes, said plurality of modulated wavelength channels in said first wavelength band being generated by a first bank of lasers, a power splitter associated with each laser in the first bank, and an external modulator associated with each output of each power splitter, each of said passive, all-optical remote nodes comprising
a WDM comprising
a first group of WDM devices for demultiplexing a plurality of multiplexed signals in a first wavelength band and a second wavelength band received from said central office into a plurality of individual channels in said first wavelength band and said second wavelength band, respectively, for distribution to said individual subscriber premises,
a second group of WDM devices for multiplexing a plurality of individual modulated channels from individual subscriber premises in a second wavelength band into a plurality of multiplexed signals in said second wavelength band, and
a third group of WDM devices for multiplexing/demultiplexing said multiplexed signals in said first and second wavelength bands, and
optical means for transmitting a modulated channel in said first and second wavelength bands to each of said subscriber premises and for receiving a modulated channel in said second wavelength band from each of said subscriber.

8. A double-star fiber optic subscriber loop architecture comprising
a central office,
at least one passive, all-optical remote node connected to the central office, and
a plurality of individual subscriber premises connected to said passive remote node,
said central office comprising means for generating a modulated wavelength channel in a first wavelength band for each of said subscriber premises, said modulated wavelength channels in said first wavelength being generated by a first bank of lasers, a power splitter associated with each laser in the first bank, and an external modulator associated with each output of each power splitter, means for multiplexing groups of said wavelength channels in said first wavelength band to form multiplexed signals in said first wavelength band for transmission to said passive remote node, and means for receiving multiplexed signals in a second wavelength band from said passive remote node and for demultiplexing said multiplexed signals in said second wavelength band into a plurality of individuals channels,
said passive remote node comprising optical means for receiving said multiplexed signals in said first wavelength band and for demultiplexing said multiplexed signal in said first wavelength band into modulated individual channels in said first wavelength band for distribution to said individual subscriber premises, and optical means for receiving individual modulated channels in said second wavelength band from said subscriber premises and for multiplexing groups of said channels in said second wavelength band to form said multiplexed signals in said second wavelength band for transmission to said central.

* * * * *